United States Patent
Balbi et al.

(10) Patent No.: US 8,113,016 B2
(45) Date of Patent: Feb. 14, 2012

(54) MOLDS OPENING/CLOSING GROUP OF A FORMING GLASS MACHINE ITEMS

(75) Inventors: Mario Balbi, Cuneo (IT); Maurizio Barolo, Fossano (IT); Marcello Ostorero, Vignolo (IT)

(73) Assignee: Bottero S.p.A., Cuneo (IT)

( * ) Notice: Subject to any disclaimer, the term of this patent is extended or adjusted under 35 U.S.C. 154(b) by 389 days.

(21) Appl. No.: 12/460,362

(22) Filed: Jul. 17, 2009

(65) Prior Publication Data

US 2010/0018256 A1     Jan. 28, 2010

(30) Foreign Application Priority Data

Jul. 17, 2008   (IT) ............... TO2008A0549

(51) Int. Cl.
C03B 9/34     (2006.01)
C03B 9/353    (2006.01)
C03B 9/44     (2006.01)
(52) U.S. Cl. ............... 65/359; 65/261; 65/361
(58) Field of Classification Search ............... 65/305, 65/313, 361, 261, 359
See application file for complete search history.

(56) References Cited

U.S. PATENT DOCUMENTS

| | | | |
|---|---|---|---|
| 3,460,931 A | 8/1969 | Rowe | 65/313 |
| 3,591,358 A | 7/1971 | Maul et al. | 65/360 |
| 4,448,600 A * | 5/1984 | Braithwaite et al. | 65/360 |
| 4,449,996 A * | 5/1984 | Irwin et al. | 65/305 |
| 6,684,665 B1 | 2/2004 | Boegert et al. | 65/360 |
| 2008/0190145 A1 * | 8/2008 | Tijerina-Ramos et al. | 65/167 |
| 2008/0209951 A1 * | 9/2008 | Armando et al. | 65/359 |
| 2008/0282739 A1 * | 11/2008 | Cramer | 65/260 |
| 2009/0025429 A1 * | 1/2009 | Armando et al. | 65/137 |

FOREIGN PATENT DOCUMENTS

FR       813789       6/1937

OTHER PUBLICATIONS

Italian Search Report issued Jun. 15, 2009 in the corresponding Priority Document IT TO2008A000549.
European search report dated Oct. 21, 2009 from corresponding EP 09165844.0.

* cited by examiner

*Primary Examiner* — Matthew Daniels
*Assistant Examiner* — Cynthia Szewczyk
(74) *Attorney, Agent, or Firm* — Ohlandt, Greeley, Ruggiero & Perle, L.L.P.

(57) ABSTRACT

In a machine for forming glass items, a mold having two half-molds movable between a closed forming position and an open extraction position by a mold opening/closing group is provided. The mold includes two handling arms, each connected to a respective half-mold, which are rotated about respective fixed hinge axes by a single linear actuator. The mobile member translates in a direction parallel to the fixed hinge axes, and is connected to the handling arms by a mechanical transmission having a respective guide-and-slide assembly for each handling arm.

10 Claims, 3 Drawing Sheets

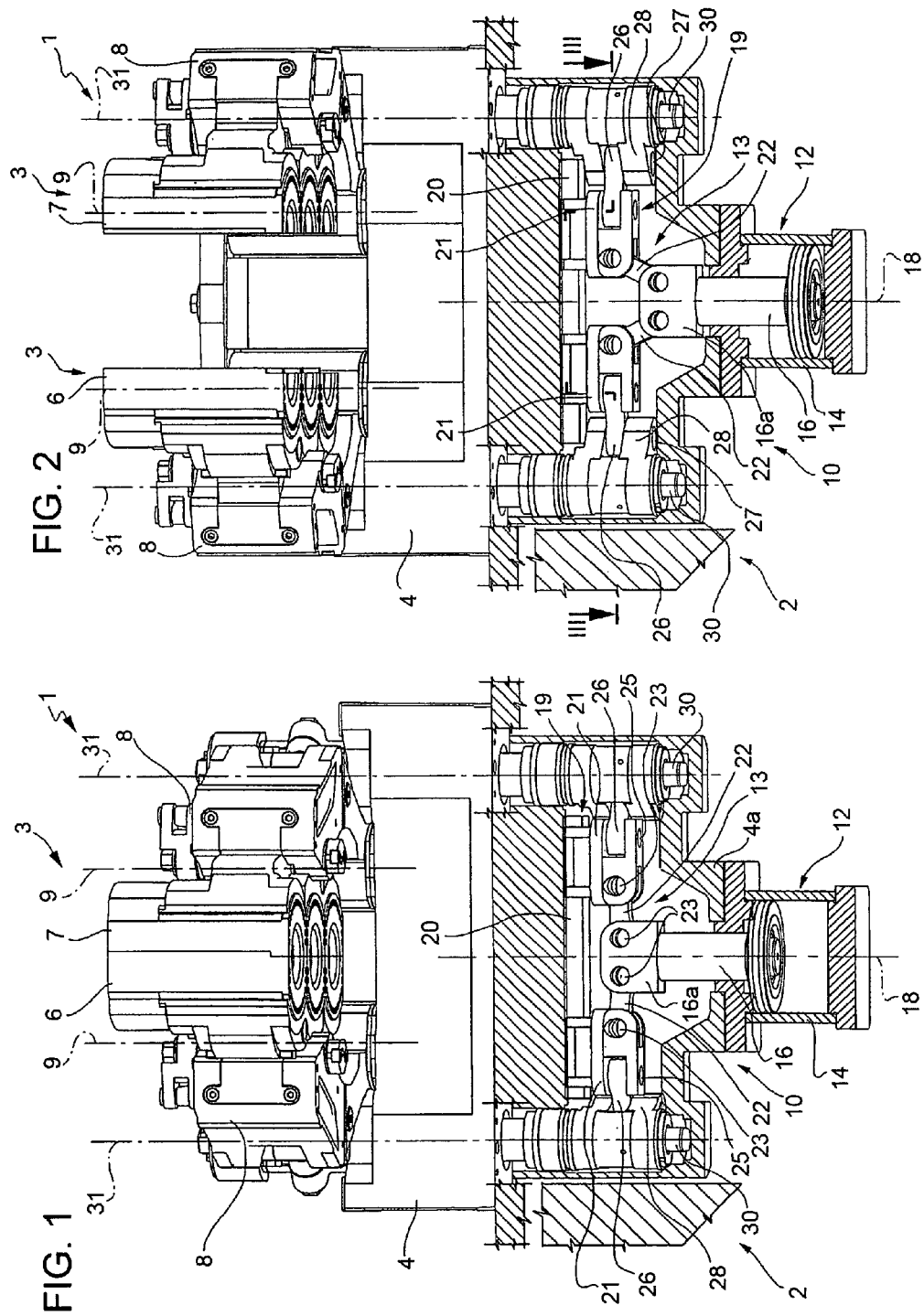

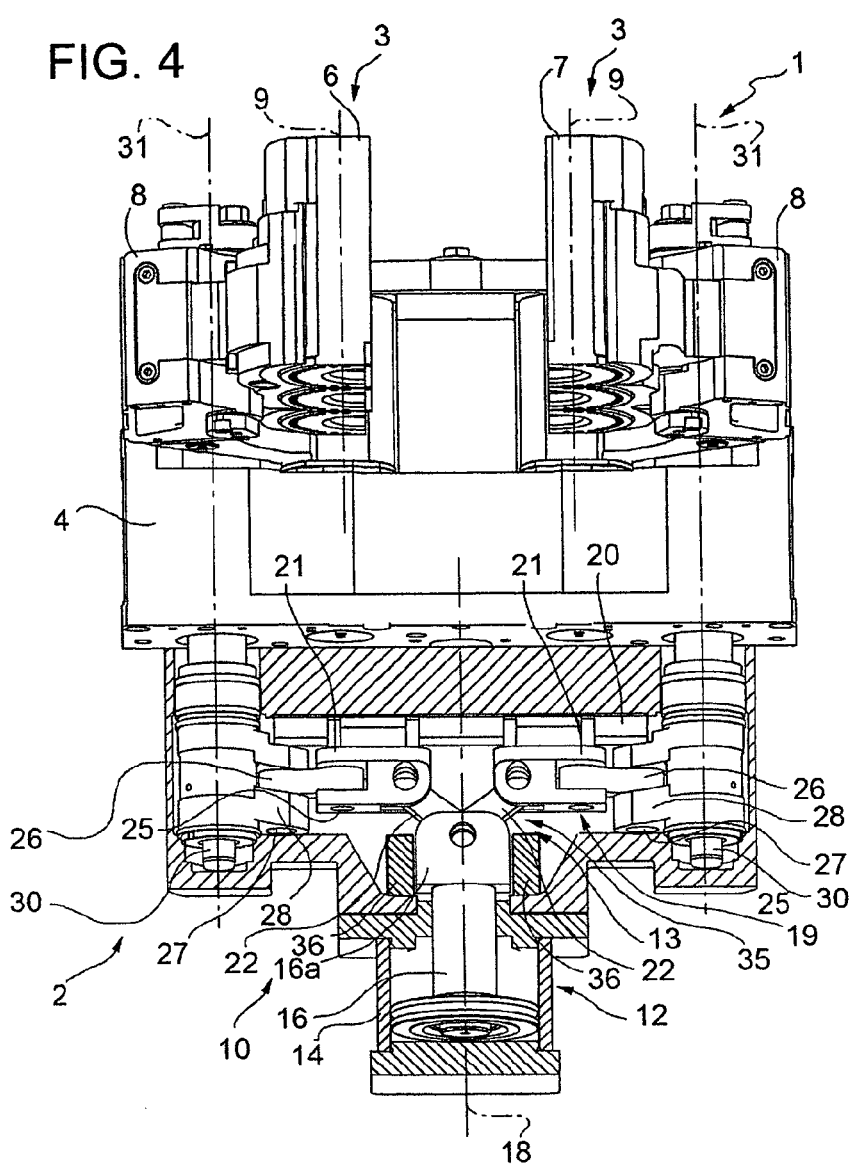
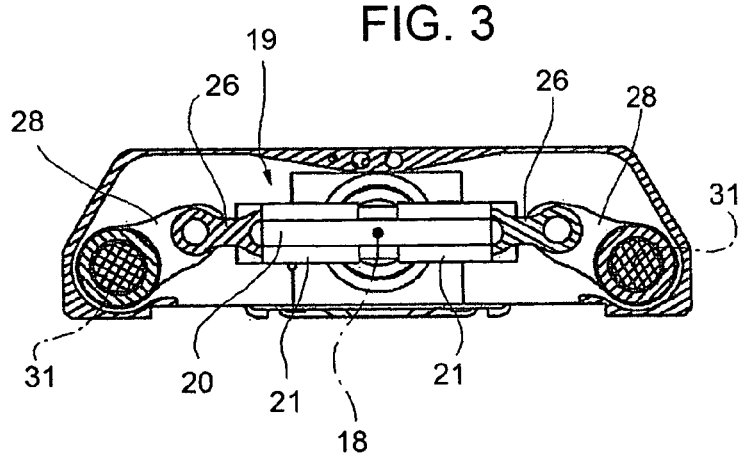

MOLDS OPENING/CLOSING GROUP OF A FORMING GLASS MACHINE ITEMS

The present invention relates to a molds opening/closing group of a machine for forming glass items.

BACKGROUND OF THE INVENTION

Glass items are known to be formed using what are commonly known as I.S. forming machines, which comprise a number of side by side forming sections, each for producing a respective succession of glass items.

Each forming section comprises a rough mold, normally with a row of adjacent cavities, each for receiving a glass gob and forming a respective semifinished item. Each semifinished item is fed in a forming direction and transferred, by an inverter, to a finish mold, in which it is worked further to obtain the desired finish item, which is then extracted from the mold and unloaded.

The rough mold and finish mold each comprise two half-molds movable with respect to each other between a closed position and an open position.

The half-molds are moved between the open and closed positions by a mold opening/closing group, which comprises, for each mold, two actuating arms connected to respective half-molds and which are hinged to a fixed structure and rotated in opposite directions about vertical axes by a mechanical crank transmission. The transmission is activated by a linear actuator, the translating output member of which is movable both ways in a direction perpendicular to the fixed vertical hinge axes.

Though widely used in conventional forming sections, known mold opening/closing groups of the above type are practically uninstallable in last-generation forming sections, mainly on account of their bulk in the forming direction. This is mainly due to the type of transmissions employed, and to the location of the actuator, which must be located as close as possible to the molds to minimize the slack inevitably present in the linkages connecting the actuator to the arms.

The bulk of the opening/closing group in the forming direction also poses various problems when removing the group from the section, e.g. for routine servicing or in the event of a malfunction, on account of removal also involving removal of other component parts of the section.

Moreover, in known transmissions, if one of the linkages connecting the actuator to the relative arm should for any reason be overloaded with respect to the other, consistent positioning of the half-molds, especially in the closed position, is no longer assured, thus impairing the quality of the finished items.

SUMMARY OF THE INVENTION

It is an object of the present invention to provide a mold opening/closing group designed to provide a straightforward, low-cost solution to the above problems.

According to the present invention, there is provided a mold opening/closing group of a forming machine for glass items and including two half-molds, mobile one respect to the other; the group including a pair of handling arms each adapted to be coupled to a corresponding half-mold and driving means for rotating said arms around respective substantially vertical fixed hinge axes between an open and a closed position; said driving means including at least one linear actuator and a mechanical transmission interposed between said handling arms and said linear actuator, characterized in that said linear actuator includes a mobile member translating in a direction parallel to said fixed hinge axes and in that said mechanical transmission includes, for each handling arm, a corresponding guide-and-slide assembly.

In the group defined above, each said guide-and-slide assembly preferably comprises at least one guide extending perpendicularly to said fixed hinge axes and to said direction.

BRIEF DESCRIPTION OF THE DRAWINGS

A number of non-limiting embodiments of the invention will be described by way of example with reference to the accompanying drawings, in which:

FIG. 1 shows a partly sectioned front view, with parts removed for clarity, of a mold featuring a preferred embodiment of a mold opening/closing group in accordance with the present invention;

FIG. 2 shows the same view as in FIG. 1, of the mold and the mold opening/closing group in a different operating position;

FIG. 3 shows a section along line III-III in FIG. 2;

FIG. 4 shows the same view as in FIG. 2, of a variation of a detail in FIG. 2;

DETAILED DESCRIPTION OF THE INVENTION

Figure 5:
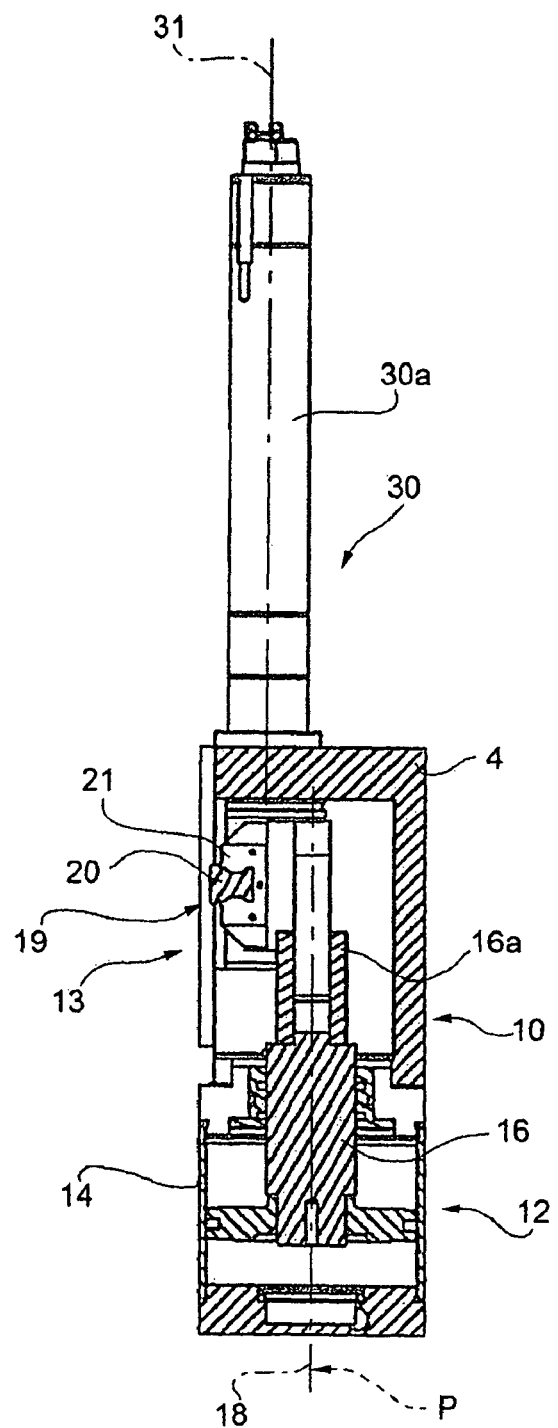
FIG. 5 shows a section, with parts removed for clarity, of a detail in FIGS. 1 and 2.

Number 1 in FIGS. 1 and 2 indicates as a whole a machine for forming glass items (not shown). Machine 1, commonly known as an I.S. machine, comprises a hollow bottom supporting structure 2, only shown partly; and a mold assembly 3, in turn comprising a connecting and supporting frame 4 locked in a fixed position to hollow structure 2, and two half-molds 6 and 7.

Each half-mold 6, 7 is connected to frame 4 by a respective arm 8, which is connected in known manner to relative half-mold 6, 7 on one side, and is hinged to frame 4, on the other side, by a hinge pin extending coaxially with a respective fixed hinge axis 9.

Arms 8 are rotated, with respect to frame 4, in opposite directions about respective fixed hinge axes 9, and by a mold opening/closing group 10, between a closed position, in which half-molds 6, 7 define an item molding cavity (FIG. 1), and an open position, in which half-molds 6, 7 are parted to permit withdrawal of the item (FIG. 2).

As shown in FIGS. 1 and 2, group 10 comprises a single linear actuator 12 common to both arms 8; and a mechanical transmission 13 interposed between linear actuator 12 and arms 8.

Linear actuator 12 comprises an outer casing 14 housed in hollow structure 2 and connected firmly to a bottom portion 4a of frame 4; and an output rod 16, which moves in opposite directions along its axis 18 parallel to axes 9, and terminates with a head 16a for connection to mechanical transmission 13.

Transmission 13 comprises a guide-and-slide assembly 19, in turn comprising a straight guide 20 connected firmly to frame 4 perpendicularly to axes 9 and 18. In the FIG. 1-3 example, straight guide 20 is connected to frame 4 in such a position as to be intersected perpendicularly by axis 18 of rod 16, as shown clearly in FIG. 3. Alternatively, in the FIG. 5 variation, straight guide 20 extends offset with respect to a plane P parallel to straight guide 20 and containing axis 18, and in particular outwards of an axial extension of rod 16 of actuator 12.

In both solutions, guide-and-slide assembly 19 also comprises two slides 21 of the same shape and size, connected to respective opposite end portions of straight guide 20, and both connected to connecting head 16a by respective connecting rods 22. Each connecting rod 22 is hinged at opposite end portions to respective slide 21 and to head 16a by respective hinge pins 23, both having axes perpendicular to axes 9 and 18. Alternatively, in a variation not shown, each connecting rod 22 is connected at opposite end portions to respective slide 21 and to head 16a by respective spherical joints. In the FIGS. 1 and 2 example, pins 23 connecting connecting rods 22 to head 16a are parallel and spaced transversely apart. In the FIG. 4 variation, connecting rods 22 are hinged to head 16a by a single common pin 23.

As shown in FIGS. 1 and 2, an end portion of a connecting rod 26 is hinged to each of slides 21 by a respective hinge pin 25 parallel to axes 9 and 18, and the opposite end of connecting rod 26 is hinged, also by a respective hinge pin 27 parallel to axes 9 and 18, to a crank 28 fitted to a bottom portion of a relative torsion shaft 30. In a variation not shown, at least one of pins 25 and 27 is replaced by a spherical joint.

Each torsion shaft 30 is connected to frame 4 in an axially fixed position to rotate about an axis 31 parallel to axes 9 and 18, and comprises, as of the bottom portion, an intermediate portion extending through frame 4; and a top portion 30a (FIG. 5) which projects upwards and is connected angularly to relative arm 8 by a known crank mechanism 33 not described in detail.

As shown in FIG. 4, actuator 12 is associated with a mold positioning device 35 for ensuring consistent positioning of the half-molds and at the same time preventing flexing of rod 16. In the example described, device 35 comprises two locators 36 located on opposite sides of head 16a, regardless of the axial position of head 16a, and to which head 16a is connected in axially sliding manner. Alternatively, in a variation not shown, device 35 comprises two fixed reference pins which, when the half-molds are in the closed position, are inserted inside respective locating seats, thus ensuring consistent positioning of the half-molds.

The "vertical" arrangement of actuator 12 therefore obviously provides, above all, for reducing bulk in the forming direction and so achieving a highly compact group. The compactness of mold opening/closing group 10 also means the entire group 10 can be inserted and extracted by simply moving it vertically, with no need to remove any other machine parts or mechanisms performing other functions.

In addition to the arrangement of the actuator, vertical movement of opening/closing group 10 as a whole is also made possible by the guide-and-slide assembly, which makes known solutions much simpler constructionwise, and more compact.

Operationwise, guide-and-slide assembly 19 ensures operation of the actuator is distributed evenly at all times, both when the connecting rods are connected to head 16a by separate pins, and especially in the case of a common pin. Operation of the actuator is also distributed evenly and consistently by virtue of the symmetry of the transmission, achieved by so positioning the guide as to be intersected by the axis of the actuator rod 16, though distribution is still fully satisfactory even when the guide is offset with respect to the axis of rod 16. In the latter position, guide-and-slide assembly 19 provides for making even better use of the space inside the supporting structure.

The reliability of group 10 is further improved by positioning device 35, which, even in the event of differing forces, e.g. due to different degrees of friction along the two linkages connecting the linear actuator to respective arms 8, still ensures correct operation of actuator 12, by eliminating transverse forces flexing the rod, thus preventing jamming, but above all ensures precise positioning of half-molds 6, 7.

Clearly, changes may be made to group 10 as described herein without, however, departing from the scope defined in the independent Claims.

In particular, totally different transmissions from those described by way of example may obviously be provided between arms 8 and the guide-and-slide assembly.

For each arm, the guide-and-slide assembly may comprise a respective guide separate from the other guide, or a twin guide and/or a twin slide for each arm.

For even greater compactness, the hinge pins of the same slide may be brought closer together, even to the extent of their hinge axes intersecting.

The invention claimed is:

1. A mold opening/closing group of a forming machine for glass items and including two relatively movable half-molds, the group comprising
   a pair of handling arms each adapted to be coupled to a corresponding half-mold and driving means for rotating said arms around respective substantially vertical fixed hinge axes between an open and a closed position;
   said driving means including at least one linear actuator and a mechanical transmission interposed between said handling arms and said linear actuator,
   wherein said linear actuator includes a mobile member translating in a direction parallel to said fixed hinge axes and in that said mechanical transmission includes, two guide and slide assemblies, wherein one of said two guide and slide assemblies is associated with one of said pair of handling arms and the other of said two guide and slide assemblies is associated with the other of the two handling arms.

2. The group according to claim 1, wherein each of said two guide and slide assemblies includes at least a corresponding guide extending at right angle to said fixed hinge axes and to said direction.

3. The group according to claim 1, wherein each of said two guide and slide assemblies include a common guide.

4. The group according to claim 1, wherein each of said guide and slide assemblies include at least one slide that slides in opposite directions along the corresponding guide; each of said guides being connected to the mobile member of said actuator through a first connecting rod hinged to the slide and to the mobile member to rotate around respective hinge mobile axes orthogonal to said fixed hinge axes and to a respective crank through a second connecting rod hinged with said slide and respective crank to rotate around second mobile hinge axes orthogonal to said hinge fixed axes.

5. The group according to claim 4, wherein said first connecting rod and second connecting rod are hinged to said mobile member to rotate around corresponding first mobile axis transversally placed apart from each other.

6. The group according to claim 4, wherein said first connecting rod and second connecting rod are hinged to said mobile member for rotating around a first common mobile hinge axis.

7. The group according to claim 1, wherein said transfer direction of said mobile member intersects each of said two guides.

8. The group according to claim 1, wherein said guides extend in a position transversally apart from said transfer direction of said mobile member.

9. The group according to claim 1, wherein it includes positioning means for placing said half-molds in relative unchanging positions and which are independently preset from the position of the mobile member.

10. The group according to claim 9, wherein said positioning means include a pair of guides located on opposite side parts of said mobile member and with which said mobile member is coupled in an axially sliding manner.

* * * * *